(12) United States Patent
Chen et al.

(10) Patent No.: US 8,876,569 B2
(45) Date of Patent: Nov. 4, 2014

(54) VACUUM CELL-ASSEMBLING DEVICE AND CELL-ASSEMBLING METHOD

(75) Inventors: Bingyu Chen, Beijing (CN); Huan Tang, Beijing (CN); Tingze Dong, Beijing (CN); Ying Liu, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 163 days.

(21) Appl. No.: 13/696,919

(22) PCT Filed: Jul. 20, 2012

(86) PCT No.: PCT/CN2012/078935
§ 371 (c)(1),
(2), (4) Date: Nov. 8, 2012

(87) PCT Pub. No.: WO2013/017022
PCT Pub. Date: Feb. 7, 2013

(65) Prior Publication Data
US 2014/0127962 A1 May 8, 2014

(30) Foreign Application Priority Data
Aug. 1, 2011 (CN) .......................... 2011 1 0218358

(51) Int. Cl.
| | | |
|---|---|---|
| F23Q 23/08 | (2006.01) | |
| F23Q 23/10 | (2006.01) | |
| H01T 21/06 | (2006.01) | |
| G02F 1/1341 | (2006.01) | |
| G02F 1/1333 | (2006.01) | |
| G02F 1/13 | (2006.01) | |

(52) U.S. Cl.
CPC ............ *G02F 1/1303* (2013.01); *G02F 1/1341* (2013.01); *G02F 1/1333* (2013.01); *G02F 1/1309* (2013.01)

USPC ...... 445/3; 445/63; 445/24; 445/25; 349/187; 349/192; 356/237.1; 356/239.1; 356/214; 356/343; 356/341; 356/337; 356/338

(58) Field of Classification Search
USPC .................... 445/3, 63, 24–25; 349/187–192; 356/337–344, 434, 213–214, 356/239.1–239.2, 237.1
See application file for complete search history.

(56) References Cited

U.S. PATENT DOCUMENTS 7,038,750 B2 * 5/2006 Nomura et al. ................ 349/129
7,567,333 B2 * 7/2009 Lee et al. ....................... 349/156
(Continued)

FOREIGN PATENT DOCUMENTS

CN 201030554 Y 3/2008
CN 201072478 Y 6/2008
(Continued)

OTHER PUBLICATIONS

Official English Translation of JP 03245033 A.*
(Continued)

*Primary Examiner* — Nimeshkumar Patel
*Assistant Examiner* — Jose M Diaz
(74) *Attorney, Agent, or Firm* — Ladas & Parry LLP

(57) ABSTRACT

The embodiments of the present invention disclose a vacuum cell-assembling device and a cell-assembling method. The vacuum cell-assembling device comprises: an upper substrate, a signal processing apparatus, and a lower substrate provided opposite to the upper substrate, wherein the upper substrate is provided with a light-emitting apparatus thereon, and the lower substrate is provided a photosensitive receiving element array thereon, and the photosensitive receiving element array is connected with the signal processing apparatus, and the signal processing apparatus is adapted for converting the electrical signals from the photosensitive receiving element array to a liquid crystal diffusion-simulation image.

20 Claims, 3 Drawing Sheets

(56) References Cited

U.S. PATENT DOCUMENTS

| 2005/0140921 A1* | 6/2005 | Lee et al. | 349/187 |
| 2009/0053965 A1 | 2/2009 | Kim et al. | |
| 2010/0090719 A1 | 4/2010 | Peng et al. | |
| 2011/0058137 A1 | 3/2011 | Huang et al. | |
| 2011/0273906 A1* | 11/2011 | Nichol et al. | 362/607 |

FOREIGN PATENT DOCUMENTS

| CN | 101719352 A | | 6/2010 | |
| CN | 102012576 A | | 4/2011 | |
| JP | 03245033 A | * | 10/1991 | G01M 11/00 |
| JP | 07294513 A | | 11/1995 | |
| JP | 1063229 A | | 3/1998 | |
| JP | 2001-111870 A | | 4/2001 | |

OTHER PUBLICATIONS

International Preliminary Report on Patentability dated Feb. 4, 2014; PCT/CN2012/078935.
First Chinese Office Action dated Feb. 27, 2014; Appln. No. 201110218358.3.
First Korea Office Action dated Jan. 23, 2014; Appln. No. 10-2012-7031368.
International Search Report mailed Aug. 11, 2012; PCT/CN2012/078935.
Korean Office Action dated Jul. 29, 2014; Appln. No. 10-2012-7031368.

* cited by examiner

VACUUM CELL-ASSEMBLING DEVICE AND CELL-ASSEMBLING METHOD

CROSS REFERENCE TO RELATED APPLICATIONS

This application is a national stage application under 35 U.S.C. 371 and claims the benefit of PCT Application No. PCT/CN2012/078935 having an international filing date of Jul. 20, 2012, which designated the United States, which PCT application claimed the benefit of Chinese Application No. 201110218358.8 filed Aug. 1, 2011, the disclosure of both the above-identified applications are incorporated herein by reference.

TECHNICAL FIELD

The present invention relates to a manufacturing field of a liquid crystal panel, especially to a vacuum cell-assembling device and a cell-assembling method.

BACKGROUND

During the manufacturing procedure of a liquid crystal panel, defects such as bubbles and the like usually occur during assembling an upper glass substrate and a lower glass substrate (generally an array substrate and a color film substrate) of a liquid crystal panel to form a cell (cell-assembling). This severely affects the quality as well as yield of the liquid crystal panel. Moreover, the courses of bubbles generation can not be monitored, which poses a considerable obstacle toward process improvement.

SUMMARY

According to the embodiments of the present invention, there is provided a vacuum cell-assembling device, comprising: an upper substrate, a signal processing apparatus, and a lower substrate provided opposite to the upper substrate, wherein the upper substrate is provided with a light-emitting apparatus thereon; the lower substrate is provided with a photosensitive receiving element array thereon for receiving light from the upper substrate; moreover, the photosensitive receiving element array is connected with the signal processing apparatus, and the signal processing apparatus is adapted for converting the electrical signals from the photosensitive receiving element array to a liquid crystal diffusion-simulation image.

In some examples, the photosensitive receiving element array is provided on the surface of the lower substrate opposing the upper substrate.

The light-emitting apparatus, for example, may comprise a light source, a light reflection plate and a light guide plate, wherein the light source is provided at one side of the light guide plate, and the light guide plate is provided below the light reflection plate.

In some examples, the light source is a UV (ultraviolet) light power, and the photosensitive receiving element array is an array constituted by a plurality of UV-sensitive resistors, for receiving UV light emitted from the UV light power of the upper substrate.

The light guide plate, for example, may be a flat-type light guide plate.

In some examples, the signal processing apparatus may comprise a two-dimensional modeling unit, for converting the electrical signals from the photosensitive receiving element array to the liquid crystal diffusion-simulation image.

In some examples, the vacuum cell-assembling device may also comprise a display apparatus which is connected with the signal processing apparatus, for displaying the liquid crystal diffusion-simulation image.

The photosensitive receiving element array, for example, may comprise a plurality of photoresistors.

The photoresistors, for example, may be in rectangular thin sheet-like shape.

According to some other embodiments of the present invention, there is provided a cell-assembling method using a vacuum cell-assembling device, with the vacuum cell-assembling device comprising: an upper substrate, a signal processing apparatus, and a lower substrate provided opposite to the upper substrate, wherein the upper substrate is provided with a light-emitting apparatus thereon, and the lower substrate is provided a photosensitive receiving element array thereon for receiving light from the upper substrate, and the photosensitive receiving element array is connected with the signal processing apparatus, and the signal processing apparatus is adapted for converting the electrical signals from the photosensitive receiving element array to a liquid crystal diffusion-simulation image, the method comprising: drop-filling liquid crystal on the lower glass substrate; cell-assembling the upper glass substrate and the lower glass substrate; observing the liquid crystal diffusion-simulation image formed in the diffusion process of the liquid crystal; and adjusting the parameters of the cell-assembling procedure according to the liquid crystal diffusion-simulation image.

In some examples, the liquid crystal is tagged liquid crystal.

For example, the tagged liquid crystal may comprise: UV-absorbing tagged liquid crystal formed by embedding molecular groups into carbon chains of ordinary liquid crystal molecules.

In some examples, the tagged liquid crystal is drop-filled at a first position on the lower glass substrate, and ordinary liquid crystal is drop-filled in other region of the lower glass substrate except the first position. In these examples, optionally, the method further comprises: after cleaning off the liquid crystal, drop-filling the tagged liquid crystal at a second position of the lower glass substrate, then drop-filling ordinary liquid crystal in other region of the lower glass substrate except the second position; and superimposing the liquid crystal diffusion-simulation images formed at the first and second positions, thereby obtaining an integrated liquid crystal diffusion-simulation image, then adjusting the parameters of the cell-assembling procedure according to the integrated liquid crystal diffusion-simulation image.

The parameters of the cell-assembling procedure, for example, may comprise: the liquid crystal amount, the liquid crystal interval, the liquid crystal temperature, and the cell-assembling pressure.

BRIEF DESCRIPTION OF THE DRAWINGS

In order to explain the embodiments of the present invention or technical schemes in the prior art with more clarity, below the accompanying drawings needed for the description of the embodiments will be introduced briefly. Obviously, the drawings in the following description are merely some embodiments of the present invention, from which other drawings may be obtained by the ordinary skilled in the art without creative effort.

REFERENCE NUMERALS

1. Upper substrate; 11. Light source; 12. Light reflection plate;
13. Light guide plate; 2. Lower substrate;
21. Photosensitive receiving element array; 3. Signal processing apparatus;
4. Display apparatus; 5. Lower glass substrate;
6. First position; 7. Second position.

DETAILED DESCRIPTION

Embodiments of the present invention provide a vacuum cell-assembling device and a cell-assembling method, which achieve real-time monitoring of liquid crystal diffusion process.

Below, the embodiments of the present invention will be described in detail with reference to the accompanying drawings.

First Embodiment

Figure 1:
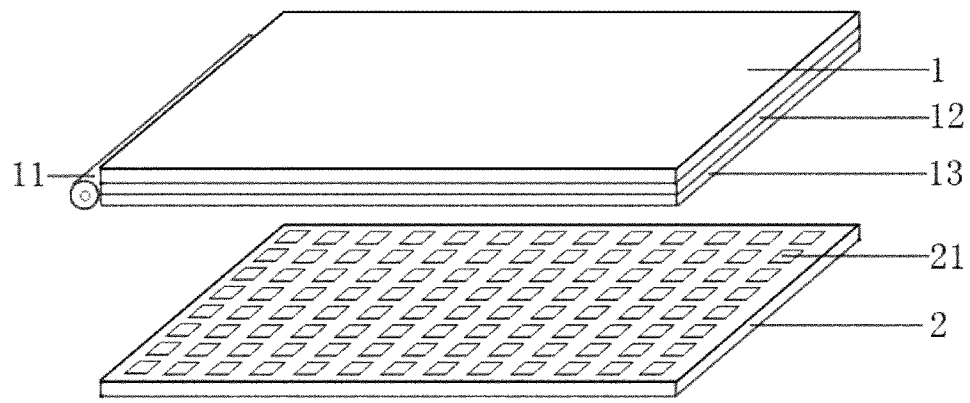
FIG. 1 is a schematic structural view of a vacuum cell-assembling device according to an embodiment of the present invention.
Figure 2:
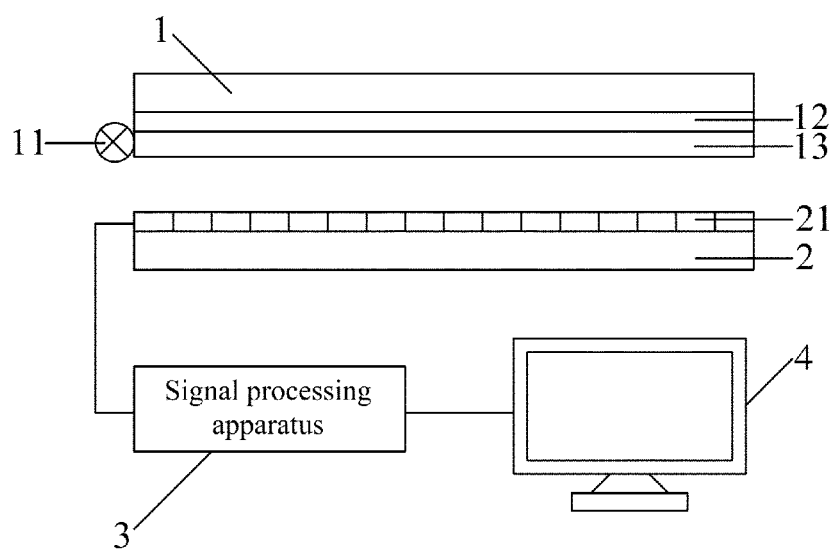
FIG. 2 is another schematic structural view of a vacuum cell-assembling device according to an embodiment of the present invention.

This embodiment provides a vacuum cell-assembling device, as shown in FIG. 1 and FIG. 2, the device comprising: an upper substrate 1, a lower substrate 2 provided opposite to the upper substrate 1, and a signal processing apparatus 3. The upper substrate 1 is provided with a light-emitting apparatus thereon, and the lower substrate 2 is provided with a photosensitive receiving element array 21 thereon, for receiving light from the upper substrate 1. The photosensitive receiving element array 21 is connected with the signal processing apparatus 3, and the signal processing apparatus 3 is adapted for converting the electrical signals from the photosensitive receiving element array 21 to a liquid crystal diffusion-simulation image.

The light-emitting apparatus of the upper substrate 1 is preferably a uniform surface light source. Specifically, the light-emitting apparatus may comprise a light source 11, a light reflection plate 12 and a light guide plate 13, wherein the light source 11 is provided at one side of the light guide plate 13, and the light guide plate 13 is provided below the light reflection plate 12.

In one example of the present embodiment, the photosensitive receiving element array 21 may be provided on the surface of the lower substrate 2 opposing the upper substrate 1. In other examples, such as cases that the lower substrate 2 is transparent compared to the upper substrate 1, the photosensitive receiving element array 21 also may be provided on the surface of the lower substrate 2 facing away from the substrate 1, or formed in an intermediate layer of the lower substrate 2.

The photosensitive receiving element array 21 may comprise a plurality of photoresistors, such as a plurality of UV-sensitive resistors.

In the vacuum cell-assembling device of this embodiment, after the light-emitting apparatus is turned on, the light emitted from the light source 11, after being scattered by the light guide plate 13 and reflected by the light reflection plate 12, forms a surface light source of downward-directed illumination. During cell-assembling, an upper glass substrate and a lower glass substrate with a liquid crystal layer sandwiched therebetween are placed between the upper substrate 1 and the lower substrate 2, and the light emitted by the light source 11, passes through the liquid crystal layer, and irradiates onto the plurality of photoresistors of the photosensitive receiving element array 21.

Photoresistors are also known as light pipes. Commonly used production materials for photoresistors include cadmium sulfide (CdS), as well as selenium, aluminum sulfide, lead sulfide and bismuth sulfide and the like. These production materials have such a property that their resistance decreases rapidly when they are illuminated by light with a specific wavelength. Therefore, a photoresistor's resistance changes with intensity of incident light: the resistance decreases when incident light is strong, and the resistance increases when incident light is weak.

Since each drop of liquid crystal molecules have different diffusion routes and diffusion processes, thereby different absorption or transmission properties for light are presented along with the diffusion of the liquid crystal molecules. When the light emitted from light source 11, passing through the liquid crystal layer, illuminates the photosensitive receiving element array 21, the various light intensity cause changes in respective photoresistors, that is, changes will occur in the electric current flowing through the photoresistors or the voltages applied to the photoresistors. In this way, changes of light are converted into changes of electrical signals. The signal processing apparatus 3 can obtain a liquid crystal diffusion-simulation image according to the changes of the electrical signals. Further, the signal processing apparatus 3 can also receive electrical signals in accordance with a certain frequency from the photosensitive receiving element array 21, and convert the electrical signals into a liquid crystal diffusion-simulation image.

Furthermore, the signal processing apparatus 3 comprises a two-dimensional modeling unit, for converting the electrical signals from the photosensitive receiving element array 21 into a liquid crystal diffusion-simulation image. The two-dimensional modeling unit processes the electrical signals at a time point into an image, and as observed in a continuous period of time, the two-dimensional modeling unit of the signal processing apparatus 3 processes the changing electrical signals into changing images. The vacuum cell-assembling device according to this embodiment also comprises a display apparatus 4, and this display apparatus 4 is connected with the signal processing apparatus 3, for continuously displaying the liquid crystal diffusion-simulation images. Thus a real-time monitoring of liquid crystal diffusion process is achieved.

Further, the photoresistors in the present embodiment each can be manufactured in a rectangular thin sheet-like shape so as to absorb more light energy.

As an implementation of the embodiment of the present invention, the light source 11 of the light-emitting apparatus may be a UV light power, and accordingly the photosensitive receiving element array 21 comprises a plurality of UV-sensitive resistors, for receiving the UV light emitted from the upper substrate.

The light guide plate 13 of this embodiment may be a flat-type light guide plate or a wedge-shaped light guide plate. With consideration that during the cell-assembly, the upper substrate 1 and the lower substrate 2 will apply a certain pressure on the upper glass substrate and the lower glass substrate, the light guide plate 13 in this embodiment is preferably a flat-type light guide plate so as to ensure the evenness of the pressure and to protect the light guide plate 13 from being damaged by the pressure.

During the operation of the vacuum cell-assembling device, it is required that the upper substrate 1 adsorbs the upper glass substrate of the liquid crystal panel, the lower substrate 2 adsorbs the lower glass substrate of the liquid crystal panel, and then the upper substrate 1 is moved exactly above the lower substrate 2 and then moved down, thus realizing the cell-assembly of the upper glass substrate and the lower glass substrate. In normal cases, there are vacuum adsorption and electrostatic adsorption as adsorption methods.

When vacuum adsorption is used as the adsorption method, it is necessary to provide vacuum adsorption holes on the upper substrate 1 to realize adsorbing the upper glass substrate. When electrostatic adsorption is used as the adsorption method, it is not necessary to provide vacuum adsorption holes. Thus, in order to ensure the integrity of the light guide plate 13 and the light reflection plate 12, the adsorption method of this embodiment is preferably electrostatic adsorption.

It should be noted that, the upper and lower substrates of a liquid crystal panel to be cell-assembled in the present invention are respectively called "upper glass substrate" and "lower glass substrate"; however, these substrates may be made of glass, and also may be substrates of other materials or types to be cell-assembled.

The vacuum cell-assembling device according to this embodiment of the present invention provides a light-emitting apparatus on the surface of the upper substrate opposing the lower substrate, and provides a photosensitive receiving element array on the surface of the lower substrate opposing the upper substrate. When the light-emitting apparatus is turn on, the light emitted from the light source, passing through the liquid crystal layer, reaches the photosensitive receiving element array, and the resistance of the photoresistors in the photosensitive receiving element array will change along with the intensity of the arriving light. Thus, the liquid crystal diffusion process between the upper glass substrate and the lower glass substrate is converted into changes of electrical signals, thereby achieving real-time monitoring of the liquid crystal diffusion process. In addition, this embodiment has the photoresistors made in rectangular thin sheet-like shape, which allows the photoresistor to absorb more light energy.

Second Embodiment

Figure 5:
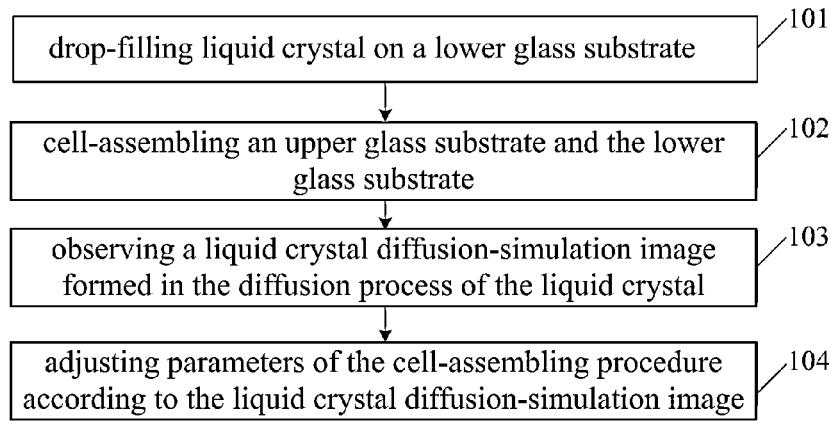
FIG. 5 is a flow chart of a cell-assembling method in an embodiment of the present invention.

This embodiment provides a cell-assembling method, as shown in FIG. 5, which comprises the following steps 101 to 104.

Step 101: drop-filling liquid crystal on a lower glass substrate.

Figure 3:
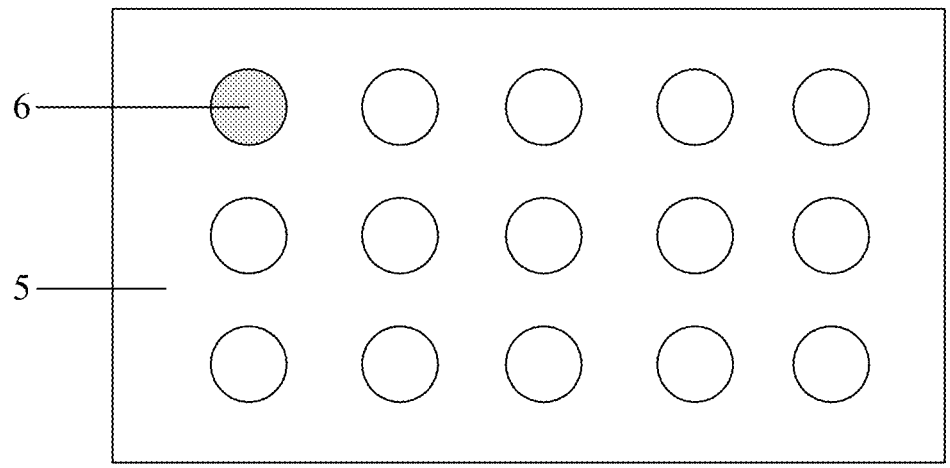
FIG. 3 is a schematic view of a first position of a lower glass substrate according to an embodiment of the present invention.

With a 14-inch liquid crystal display screen as an example, during forming of a liquid crystal layer, as shown in FIG. 3, it is required to use a liquid crystal dropping apparatus to drop-fill 10-20 drops of liquid crystal evenly on the lower glass substrate 5. The locations of the dots in FIG. 3 represent the positions where liquid crystal needs to be drop-filled.

As a specific implementation of the present invention, the liquid crystal may use tagged liquid crystal, for example, UV-absorbing liquid crystal molecules which are formed by embedding molecular groups into carbon chains of ordinary liquid crystal molecules.

Embedding of molecular groups such as C=C or C=O or C=N or N=N and the like in carbon chains of ordinary liquid crystal molecules can make the new generated tagged liquid crystal molecules absorb UV light; the embedding method may be conducted by causing ordinary liquid crystal molecules to undergo certain chemical reactions. With a certain carbon chain of a liquid crystal molecule as an example, the chemical reactions may be expressed as below:

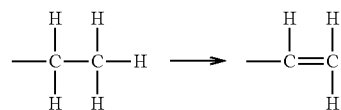

Through the above reaction, the carbon chains of ordinary liquid crystal molecules have C=C molecular groups, and in this way, the tagged liquid crystal is formed.

Step 102: cell-assembling an upper glass substrate and the lower glass substrate.

The method of this embodiment uses the vacuum cell-assembling device described in the first embodiment; as an example, a UV light power is selected as the light source, and accordingly the photosensitive receiving element array comprises a plurality of UV-sensitive resistors. After the light-emitting apparatus of the vacuum cell-assembling device is turned on, the UV light emitted from the light-emitting apparatus, passing through the drop-filled liquid crystal, reaches the photosensitive receiving element array.

Since the drop-filled liquid crystal is UV-absorbing tagged liquid crystal, thus most of the UV light is absorbed by the tagged liquid crystal when the UV light is transmitting through the above described liquid crystal, which means that the region covered with the tagged liquid crystal receives less UV radiation, and accordingly less UV light reaches the corresponding UV-sensitive resistors. Therefore, the resistance of the UV-sensitive resistors in the region corresponding to the tagged liquid crystal is relatively large. The region corresponding to the tagged liquid crystal and the region that is not covered by the tagged liquid crystal are thus distinguished, and the greater the density of the tagged liquid crystal is, the larger the resistance of the UV-sensitive resistors become.

Step 103: observing a liquid crystal diffusion-simulation image formed in the diffusion process of the liquid crystal.

During cell-assembling, the liquid crystal diffusion-simulation image formed in the diffusion process of the tagged liquid crystal is observed through a display apparatus.

Step 104: adjusting parameters of the cell-assembling procedure according to the liquid crystal diffusion-simulation image.

Herein, the parameters of the cell-assembling procedure comprise: liquid crystal amount, liquid crystal interval, liquid crystal temperature, and cell-assembling pressure.

In the method of this embodiment, the values of the liquid crystal amount, the liquid crystal interval, the liquid crystal temperature and the cell-assembling pressure may be preset before the cell-assembly, then during the cell-assembly, it may be observed through the vacuum cell-assembling device whether or not the liquid crystal diffusion meets the requirements and whether or not there is a lot of generated bubbles under such a set of parameters. If the liquid crystal diffusion does not meet the requirements, then at least one of the parameters of the liquid crystal amount, the liquid crystal interval, the liquid crystal temperature, and the cell-assembling pressure will be changed; thereafter the cell-assembling test is performed again, until the liquid crystal diffusion meets the requirements and the quantity of the generated bubbles are within a permissible range of the process. The process to observe the liquid crystal diffusion-simulation image formed in the diffusion process of the tagged liquid crystal and adjust the parameters of the cell-assembling procedure according to that image may be performed by a person, and also may be accomplished automatically by a machine with a preset programming instruction.

The cell-assembling method, according to this embodiment, forms tagged liquid crystal by marking liquid crystal molecules, and at the same time utilizes the property that the tagged liquid crystal can absorb UV light, so that the signal processing apparatus is allowed to identify the regions covered with liquid crystal and the regions not covered with liquid crystal, as well as the covering thickness of the liquid crystal. In this way, the liquid crystal diffusion process can be monitored, and thus the producing process of a liquid crystal panel is improved and the yield is increased.

Third Embodiment

Figure 6:
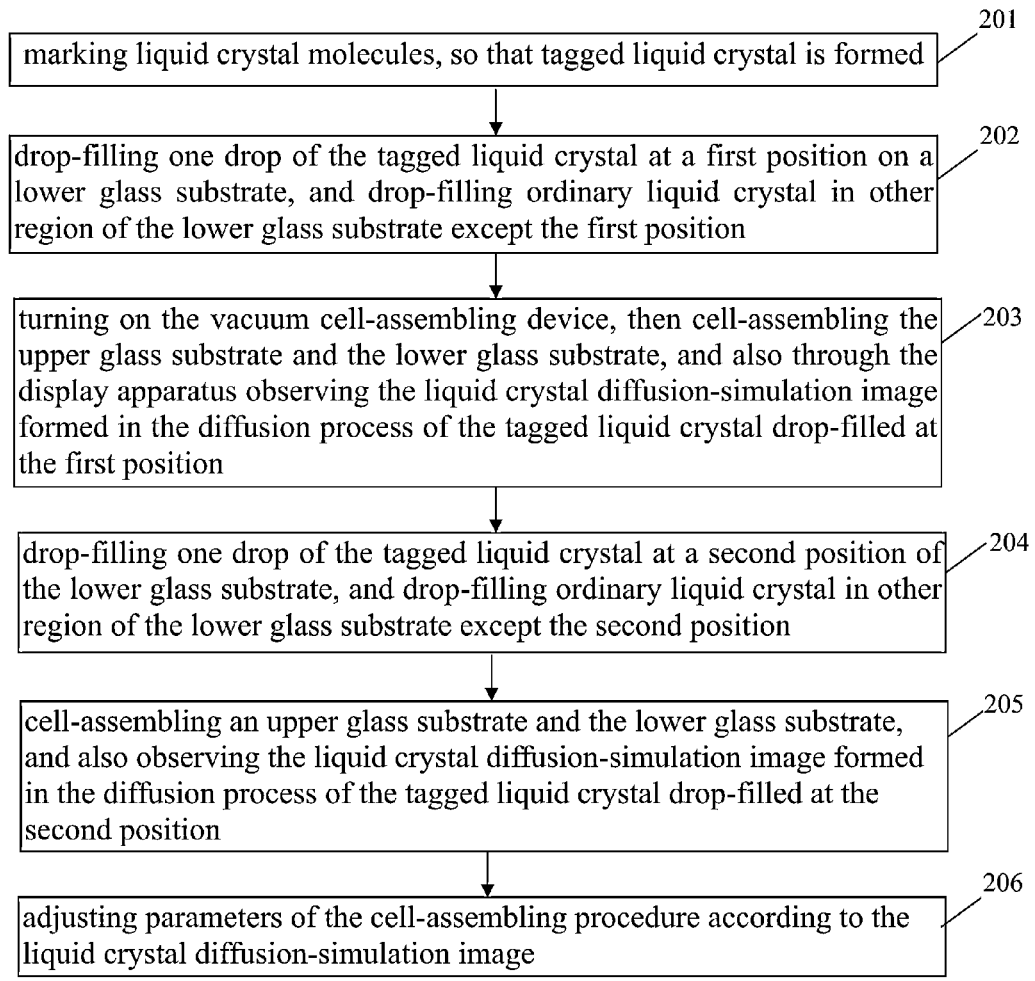
FIG. 6 is another flow chart of a cell-assembling method in an embodiment of the present invention.

The present embodiment provides a cell-assembling method, as shown in FIG. 6, which comprises the following steps 201 to 206.

Step 201: marking liquid crystal molecules, so that tagged liquid crystal is formed.

As a specific implementation of marking, molecular groups may be embedded in carbon chains of ordinary liquid crystal molecules, thus forming UV-absorbing liquid crystal molecules.

Embedding of molecular groups such as C═C or C═O or C═N or N═N and the like in carbon chains of ordinary liquid crystal molecules can make the new generated tagged liquid crystal molecules absorb UV light; the embedding method may be conducted by causing ordinary liquid crystal molecules to undergo certain chemical reactions. With a certain carbon chain of a liquid crystal molecule as an example, the chemical reactions may be expressed as below:

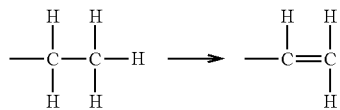

Through the above reaction, the carbon chains of ordinary liquid crystal molecules have C═C molecular groups.

Step 202: drop-filling one drop of the tagged liquid crystal at a first position on a lower glass substrate, and drop-filling ordinary liquid crystal in other region of the lower glass substrate except the first position.

With a 14-inch liquid crystal display screen as an example, during manufacture of a liquid crystal layer, as shown in FIG. 3, it is required to use a liquid crystal dropping apparatus to drop-fill 10-20 drops of liquid crystal evenly on the lower glass substrate 5. The locations of the dots in FIG. 3 represent the positions where liquid crystal needs to be drop-filled. The present embodiment chooses one of the positions, denoted as a first position 6, and drop-fills the tagged liquid crystal on the first position 6, while the other positions are drop-filled ordinary liquid crystal.

Step 203: turning on the vacuum cell-assembling device, then cell-assembling the upper glass substrate and the lower glass substrate, and also through the display apparatus observing the liquid crystal diffusion-simulation image formed in the diffusion process of the tagged liquid crystal drop-filled at the first position.

The method of this embodiment uses the vacuum cell-assembling device described in the first embodiment, wherein a UV light power is selected as a light source, and accordingly the photosensitive receiving element array comprises a plurality of UV-sensitive resistors. After the light-emitting apparatus of the vacuum cell-assembling device is turned on, the UV light emitted from the light-emitting apparatus, passing through the drop-filled liquid crystal, reaches the photosensitive receiving element array.

Since the first position 6 is drop-filled with tagged liquid crystal, most of the UV light is absorbed by the tagged liquid crystal when the UV light is transmitting through the above described liquid crystal, which means that the first position 6 as well as the surrounding region thereof receive less UV radiation, and accordingly less UV light reaches the corresponding UV-sensitive resistors. Therefore, the resistance of the UV-sensitive resistors in the region corresponding to the tagged liquid crystal is relatively large. The region corresponding to the tagged liquid crystal and the region corresponding to the ordinary liquid crystal are thus distinguished, and the greater the density of the tagged liquid crystal is, the larger the resistance of the UV-sensitive resistors becomes. By way of the above method, in the vacuum cell-assembling device, it is possible to monitor the diffusion process of the tagged liquid crystal drop-filled at the first position 6.

Step 204: drop-filling one drop of the tagged liquid crystal at a second position of the lower glass substrate, and drop-filling ordinary liquid crystal in other region of the lower glass substrate except the second position.

Figure 4:
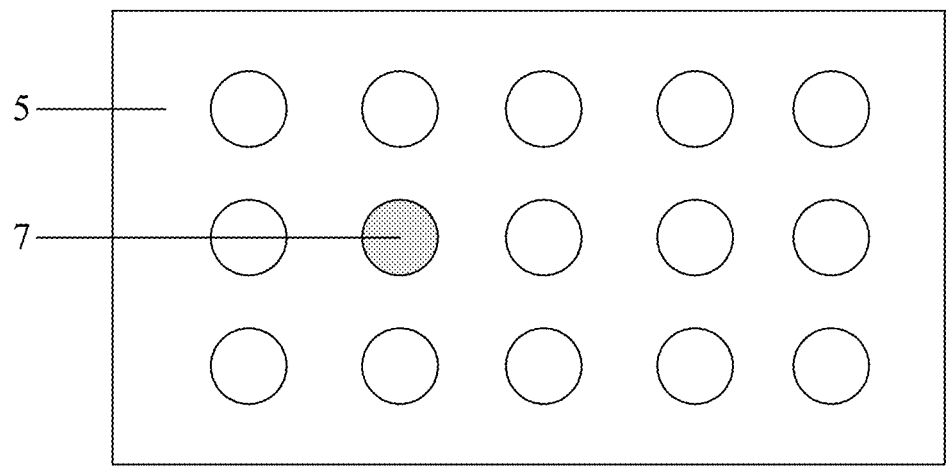
FIG. 4 is a schematic view of a second position of a lower glass substrate according to an embodiment of the present invention.

After completion of the step 203, in order to save experimental materials, the liquid crystal sandwiched between the upper glass substrate and the lower glass substrate may be cleaned off, as shown in FIG. 4, and then a liquid crystal dropping apparatus is used to drop-fill one drop of the tagged liquid crystal at the second position 7 of the lower glass substrate 5 and drop-fill ordinary liquid crystal in other region of the lower glass substrate except the second position 7.

Step 205: cell-assembling an upper glass substrate and the lower glass substrate, and also observing the liquid crystal diffusion-simulation image formed in the diffusion process of the tagged liquid crystal drop-filled at the second position.

Likewise, the diffusion process of the tagged liquid crystal drop-filled at the second position 7 is monitored.

In each cell-assembling experiment, the diffusion process of a liquid crystal droplet at the same location is basically similar, because the force-bearing condition of a liquid crystal droplet at the same location is basically the same, although the liquid crystal diffusion process at the same location such as the first position 6 is different each time. Therefore, by superimposing the diffusion process of the tagged liquid crystal drop-filled at the first position and the second position, the liquid crystal diffusion processes of the regions corresponding to the first position and the second position are obtained; further, by superimposing respective diffusion process after the respective diffusion process of the liquid crystal droplet at each location is obtained through the above method, the diffusion process of the whole liquid crystal layer can be monitored. The specific location for drop-filling tagged liquid crystal on the lower glass substrate may be the first position or the second position, and also may be any other location for drop-filling a liquid crystal droplet.

Step 206: adjusting parameters of the cell-assembling procedure according to the liquid crystal diffusion-simulation image.

Herein, the parameters of the cell-assembling procedure comprise liquid crystal amount, liquid crystal interval, liquid crystal temperature, and cell-assembling pressure.

In the method of this embodiment, the values of the liquid crystal amount, the liquid crystal interval, the liquid crystal temperature and the cell-assembling pressure may be preset before the cell-assembly, then during the cell-assembling, it may be observed through the vacuum cell-assembling device whether or not the liquid crystal diffusion meets the requirements and whether or not there is a lot of generated bubbles under such a set of parameters. If the liquid crystal diffusion does not meet the requirements, then at least one of the parameters from the liquid crystal amount, the liquid crystal interval, the liquid crystal temperature, and the cell-assembling pressure will be changed, and thereafter the cell-assembling test is performed again until the liquid crystal diffusion meets the requirements and the quantity of the generated bubbles is within a permissible range of the process.

The cell-assembling method of this embodiment, by drop-filling the tagged liquid crystal at the first position, makes the most of the UV light absorbed by the tagged liquid crystal when the UV light is transmitting through the liquid crystal drop-filled at the first position, so that the resistance of the UV-sensitive resistors in the region corresponding to the tagged liquid crystal is relatively large, while the resistance in other regions is relatively small. In this way, in the vacuum cell-assembling device, it is possible to monitor the diffusion process of the tagged liquid crystal drop-filled at the first position. By superimposing the resultant diffusion processes of liquid crystal droplets at respective locations, the diffusion process of the whole liquid crystal layer can be monitored, and thus the producing processes of a liquid crystal panel is improved and the yield is increased.

Through the above description of the implementations, it can be understood clearly by those skilled in the art that, the present invention can be realized by means of software plus necessary common hardware, and certainly, it also can be realized by hardware, but in many cases the former is a better manner. Based on such understanding, the technical schemes of the present invention in essence or the part contributing to the prior art, can be embodied in form of a software product, and the computer software product is stored in accessible storage medium, such as a floppy, a hard disk or a CD-ROM used with a computer, which comprises a number of instructions for making a computer device (maybe a personal computer, a server, or a network device, etc.) implement the method described in various embodiment of the present invention.

The above description is merely specific implementations of the present invention, and the protection scope of the present invention is not limited to the above description. In the disclosed technical scope of the present invention, any variations or replacements which are easily conceived by any skilled who is familiar with the art, should be included within the protection scope of the present invention. Therefore, the protection scope of the present invention should be defined by the protection scope of the claims.

The invention claimed is:

1. A vacuum cell-assembling device comprising: an upper substrate, a signal processing apparatus, and a lower substrate provided opposite to the upper substrate, wherein,
the upper substrate is provided with a light-emitting apparatus thereon,
the lower substrate is provided with a photosensitive receiving element array thereon for receiving light from the upper substrate, and
the photosensitive receiving element array is connected with the signal processing apparatus, and the signal processing apparatus is adapted for converting the electrical signals from the photosensitive receiving element array to a liquid crystal diffusion-simulation image.

2. The vacuum cell-assembling device according to claim 1, wherein the photosensitive receiving element array is provided on a surface of the lower substrate opposing the upper substrate.

3. The vacuum cell-assembling device according to claim 2, wherein the light-emitting apparatus comprises a light source, a light reflection plate and a light guide plate, and wherein the light source is provided at one side of the light guide plate, and the light guide plate is provided below the light reflection plate.

4. The vacuum cell-assembling device according to claim 3, wherein the light source is a UV light power, and the photosensitive receiving element array is an array constituted by a plurality of UV-sensitive resistors for receiving UV light from the UV light power of the upper substrate.

5. The vacuum cell-assembling device according to claim 3, wherein the light guide plate is a flat-type light guide plate.

6. The vacuum cell-assembling device according to claim 1, wherein the light-emitting apparatus comprises a light source, a light reflection plate and a light guide plate, and wherein the light source is provided at one side of the light guide plate, and the light guide plate is provided below the light reflection plate.

7. The vacuum cell-assembling device according to claim 6, wherein the light source is a UV light power, and the photosensitive receiving element array is an array constituted by a plurality of UV-sensitive resistors for receiving UV light from the UV light power of the upper substrate.

8. The vacuum cell-assembling device according to claim 6, wherein the light guide plate is a flat-type light guide plate.

9. The vacuum cell-assembling device according to claim 1, wherein the signal processing apparatus comprises a two-dimensional modeling unit for converting the electrical signals from the photosensitive receiving element array to the liquid crystal diffusion-simulation image.

10. The vacuum cell-assembling device according to claim 9, further comprising a display apparatus which is connected with the signal processing apparatus, for displaying the liquid crystal diffusion-simulation image.

11. The vacuum cell-assembling device according to claim 1, further comprising a display apparatus which is connected with the signal processing apparatus, for displaying the liquid crystal diffusion-simulation image.

12. The vacuum cell-assembling device according to claim 1, wherein the photosensitive receiving element array comprises a plurality of photoresistors.

13. The vacuum cell-assembling device according to claim 12, wherein the photoresistors are each in a rectangular thin sheet-like shape.

14. A cell-assembling method using a vacuum cell-assembling device, the vacuum cell-assembling device comprising: an upper substrate, a signal processing apparatus, and a lower substrate provided opposite to the upper substrate, wherein the upper substrate is provided with a light-emitting apparatus thereon, and the lower substrate is provided a photosensitive receiving element array thereon for receiving light from the upper substrate, and the photosensitive receiving element array is connected with the signal processing apparatus, and the signal processing apparatus is adapted for converting the electrical signals from the photosensitive receiving element array to a liquid crystal diffusion-simulation image, and the method comprising:

drop-filling liquid crystal on the lower glass substrate;

cell-assembling the upper glass substrate and the lower glass substrate;

observing the liquid crystal diffusion-simulation image formed in the diffusion process of the liquid crystal; and adjusting the parameters of the cell-assembling procedure according to the liquid crystal diffusion-simulation image.

15. The cell-assembling method according to claim 14, wherein the liquid crystal is tagged liquid crystal.

16. The cell-assembling method according to claim 15, wherein the tagged liquid crystal comprises:

UV-absorbing tagged liquid crystal formed by embedding molecular groups into carbon chains of ordinary liquid crystal molecules.

17. The cell-assembling method according to claim 16, wherein, drop-filling the tagged liquid crystal at a first position on the lower glass substrate, and drop-filling ordinary liquid crystal in other region of the lower glass substrate except the first position; and the method further comprises:

after cleaning off the liquid crystal, drop-filling the tagged liquid crystal at a second position of the lower glass substrate, and drop-filling ordinary liquid crystal in other region of the lower glass substrate except the second position;

superimposing the liquid crystal diffusion-simulation images formed at the first and second positions, thereby obtaining an integrated liquid crystal diffusion-simulation image, then adjusting the parameters of the cell-assembling procedure according to the integrated liquid crystal diffusion-simulation image.

18. The cell-assembling method according to claim 15, wherein, drop-filling the tagged liquid crystal at a first position on the lower glass substrate, and drop-filling ordinary liquid crystal in other region of the lower glass substrate except the first position.

19. The cell-assembling method according to claim 18, further comprising:

after cleaning off the liquid crystal, drop-filling the tagged liquid crystal at a second position of the lower glass substrate, and drop-filling ordinary liquid crystal in other region of the lower glass substrate except the second position;

superimposing the liquid crystal diffusion-simulation images formed at the first and second positions, thereby obtaining an integrated liquid crystal diffusion-simulation image, then adjusting the parameters of the cell-assembling procedure according to the integrated liquid crystal diffusion-simulation image.

20. The cell-assembling method according to claim 14, wherein the parameters of the cell-assembling procedure comprise: liquid crystal amount, liquid crystal interval, liquid crystal temperature, and cell-assembling pressure.

\* \* \* \* \*